US012765581B2

(12) United States Patent
Murali

(10) Patent No.: US 12,765,581 B2
(45) Date of Patent: Oct. 20, 2026

(54) PROCESS FOR TREATMENT OF SPENT MEDIA FROM VEGETABLE PICKLE

(71) Applicant: MARCATUS QED INC., Toronto (CA)

(72) Inventor: Sundar Murali, Toronto (CA)

(73) Assignee: MARCATUS QED INC., Toronto (CA)

( * ) Notice: Subject to any disclaimer, the term of this patent is extended or adjusted under 35 U.S.C. 154(b) by 418 days.

(21) Appl. No.: 18/275,237

(22) PCT Filed: Feb. 1, 2022

(86) PCT No.: PCT/IB2022/050845

§ 371 (c)(1),
(2) Date: Aug. 1, 2023

(87) PCT Pub. No.: WO2022/167921

PCT Pub. Date: Aug. 11, 2022

(65) Prior Publication Data

US 2024/0108036 A1 Apr. 4, 2024

(30) Foreign Application Priority Data

Feb. 3, 2021 (IN) ............................. 202141004648

(51) Int. Cl.
*A23L 5/20* (2016.01)
*A23L 5/30* (2016.01)

(52) U.S. Cl.
CPC ................. *A23L 5/273* (2016.08); *A23L 5/36* (2016.08); *A23V 2300/02* (2013.01); *A23V 2300/24* (2013.01); *A23V 2300/38* (2013.01)

(58) Field of Classification Search
CPC ....... A23L 5/273; A23L 5/36; A23V 2300/38; A23V 2300/02; A23B 7/00; A23B 2/53
See application file for complete search history.

(56) References Cited

FOREIGN PATENT DOCUMENTS

| | | | |
|---|---|---|---|
| CN | 103603330 | A | 2/2014 |
| CN | 108164035 | A | 6/2018 |

(Continued)

OTHER PUBLICATIONS

Keith N Bourgeous et al. "Performance evaluation of a cloth-media disk filter for wastewater reclamation", Water Environ Res, Nov.-Dec. 2003, 75: 532-8, DOI: 10.2175/106143003X141321.

(Continued)

*Primary Examiner* — Kelly J Bekker
(74) *Attorney, Agent, or Firm* — Rivka Friedman

(57) ABSTRACT

The present invention discloses a process for the treatment of spent media from vegetable pickle, comprising the steps of a) adding activated carbon to the spent media and heating the media to a temperature of at least 40° C., b) circulating said heated media from step a) through a charge modified depth filter sheet, c) passing the filtrate from step b) through a membrane filter, d) circulating the filtrate from step c) through an ultra violet filter, e) adding sulphites to the filtrate of step d), and f) adding acetic acid or natural alcohol vinegar to the filtrate of step e) to produce the treated spent media. The treated spent media obtained from said process possess enhanced shelf life of up to one year, possess desirable organoleptic, physical, chemical and biological properties as that of fresh media and is suitable for vegetable pickling.

13 Claims, 4 Drawing Sheets

(56) References Cited

FOREIGN PATENT DOCUMENTS

| | | | |
|---|---|---|---|
| CN | 108164035 | B | 6/2020 |
| JP | H0523548 | A | 2/1993 |
| JP | H07147895 | A | 6/1995 |
| RU | 107022 | U1 | 8/2011 |
| RU | 2710352 | C2 | 12/2019 |

OTHER PUBLICATIONS

Russian Office Action for 2023122478 Mailed on Apr. 23, 2025, pp. 1-12.
Russian Search Report for 2023122478 Mailed on Apr. 22, 2025, pp. 1-4.
Extended European Search Report for 22749320.2 Mailed on Dec. 23, 2024, pp. 1-10.

PROCESS FOR TREATMENT OF SPENT MEDIA FROM VEGETABLE PICKLE

FIELD OF THE INVENTION

The present invention relates to food preservation industry particularly to vegetable pickling using acidified media. Present invention discloses a process for the treatment of spent media which is generated during repackaging of acidified vegetables, to produce a treated spent media with enhanced shelf life and with the desirable physical, chemical, biological and organoleptic properties suitable for re-employment of the same for acidification of vegetables.

BACKGROUND OF THE INVENTION

Vegetables are generally processed and preserved by fermentation, direct acidification or a combination of these, along with pasteurization or refrigeration with selected additives, to yield products with extended shelf life and enhanced safety from microbial contamination. Fermented vegetables refers to vegetables that are preserved by fermentation, wherein vegetables are subjected to the action of acid-producing microorganisms that will naturally achieve and maintain a pH of 4.6 or lower, regardless of whether acid is added. The primary acidulants in the product are the acids naturally produced by the action of microorganisms. Acidified vegetables is used to refer to products in which an acid is directly added to preserve any non-fermented vegetable with an initial pH above 4.6, so that the final product pH is maintained below the initial pH regardless of whether acetic acid is used for acidification. Pickled vegetables is used to refer to any vegetables preserved by process of acidification or fermentation in a media. in case of acidification, a solution of vinegar (acetic acid) of natural or synthetic origin—is added along with other ingredients as salt, firming agents, preservatives (if required) and held till the vegetables achieve equilibrium to a stable acidity and pH levels. Fermentation process uses lactic acid bacteria (naturally present or by inoculation) to generate lactic acid naturally by fermentation of sugars in vegetables, till stable acidity and pH levels are achieved at equilibrium. In the present invention, the term vegetable pickling is confined to refer to acidified vegetables covered with a media that contains natural acid source such as natural vinegar or a synthetic acid source such as acetic acid as the major acidifying agent.

The processing and preservation of vegetable products particularly by pickling procedure requires soaking of vegetables in huge amount of media comprising natural vinegar or acetic acid, salt, firming agents, preservatives (sulphites). Repackaging of processed and preserved vegetables results in the production of huge amounts of spent media, which refers to the media employed for pickling of vegetables, which is drained out from the pickling containers after the removal of soaked vegetables. Typically said spent media is a vinegar medium which has an acidity of about 2-3.6%, salt concentration of about 4%, calcium as calcium chloride at about 1500 ppm, sulphites at about 30-50 ppm along with organic and inorganic suspended particulate matter. On an average, the processing of vegetable products generates at least about 1500 litres/day-50000 litres/month of spent media. Presently said spent media is disposed by means of evaporation in effluent treatment plant. Although the spent media is not toxic, it has to be treated in effluent treatment plant due to the presence of high concentration of salts and possible contaminants which the media would have captured during the pickling process before disposing the same by means of evaporation. Hence disposal of spent media is a highly labour intensive and a cost-intensive process. Further said disposal of spent media by evaporation also causes tremendous adverse impact on the environment.

Considering the high volume of generated spent media, which is otherwise disposed as a waste product through the effluent treatment plant, it would be highly desirable and advantageous if the spent media is made reusable by adopting a suitable method. Therefore, to obviate the afore-recited problems existing in the art, the inventors of the present invention meticulously conceived a method for the efficient reprocessing and reconditioning of the spent media to make it reusable with desirable organoleptic properties and enhanced shelf life.

OBJECTIVES OF THE INVENTION

The objective of the present invention is to provide a process for the efficient reprocessing and reconditioning of the spent media from vegetable pickle to make it reusable with enhanced shelf life. Said process removes or reduces the suspended particulate matter, unpleasant odor, undesirable color and the microbial content present in the spent media to acceptable level to make it suitable for re-employment in pickling processes. The treated spent media generated by said process also possess enhanced shelf life, ranging from six months to one year, preferably up to one year, until when the treated spent media can be stored and employed for pickling vegetables. Said process also eliminates the problems associated with the disposal of spent media.

SUMMARY OF THE INVENTION

The present inventors have conducted numerous iterative processes and pursued intensive research, and as a result, have found that the above described objectives can be achieved by subjecting the spent media to a process comprising a sequence of steps as recited in the following process which is described in point 1 which is the primary aspect of the present invention.

1. A process for treatment of spent media from vegetable pickle, comprising the steps:
   a) adding activated carbon to the spent media and heating the media to a temperature of at least 40° C.,
   b) circulating the media from step a) through a charge modified depth filter sheet,
   c) passing the filtrate from step b) through a membrane filter,
   d) circulating the filtrate from step c) through a ultra violet filter,
   e) adding sulphites to the filtrate of step d), and
   f) adding acetic acid or natural alcohol vinegar to the filtrate of step e) to produce the treated spent media.

The spent media is a spent vinegar medium with an acid content of 3.6% and a salt content of 4.0% and in step (a), said spent media can be heated to a temperature of 40-50° C. The charge modified depth filter sheet of step (b) comprises diatomaceous earth and/or cellulose. Sulphites comprising sulphites, bisulphites, metabisulphite salts of sodium or potassium are added to the filtrate of step d) to provide a concentration of 0.2-0.5 mg/ml or 200 to 500 ppm. Acetic acid in the range of 10%-15% v/v or natural alcohol vinegar in the range of 10%-15% is added to the filtrate of step e).

In an embodiment, the filtrate from step (b) of the above recited process is further circulated through a carbon filter before passing through the membrane filter of step (c). Said carbon filter is a charge modified depth filter sheet comprising activated carbon and/or cellulose. The membrane filter is a polypropylene membrane filter with a pore size of 1.2 microns or less.

In yet another embodiment, the filtrate from step (c) is further passed through a poly ether sulphone filter before circulating the filtrate through a ultra violet filter.

In yet another aspect, the present invention also provides a treated spent media generated as per the above described process. Said treated spent media can be stored for up to 12 months at ambient storage temperature conditions.

BRIEF DESCRIPTION OF DRAWINGS

The following detailed description of the invention will be better understood when read in conjunction with the appended drawings. For the purpose of assisting in the explanation of the invention, there are shown in the drawings embodiments which are presently preferred and considered illustrative. It should be understood, however, that the invention is not limited to the precise arrangements and instrumentalities shown therein.

DETAILED DESCRIPTION OF THE INVENTION

Figure 1:
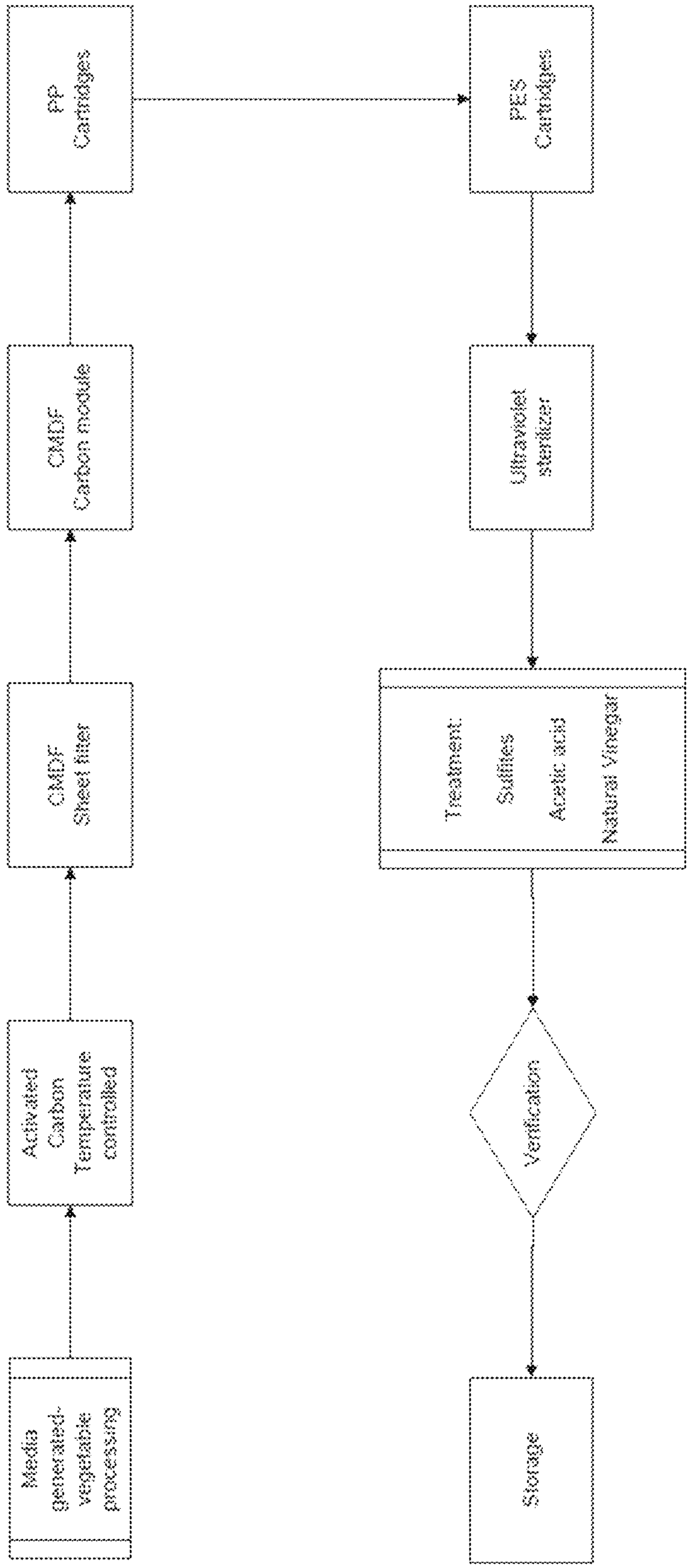
FIG. 1: Flowchart representing the process for the treatment of spent media from vegetable pickle
Figure 2:
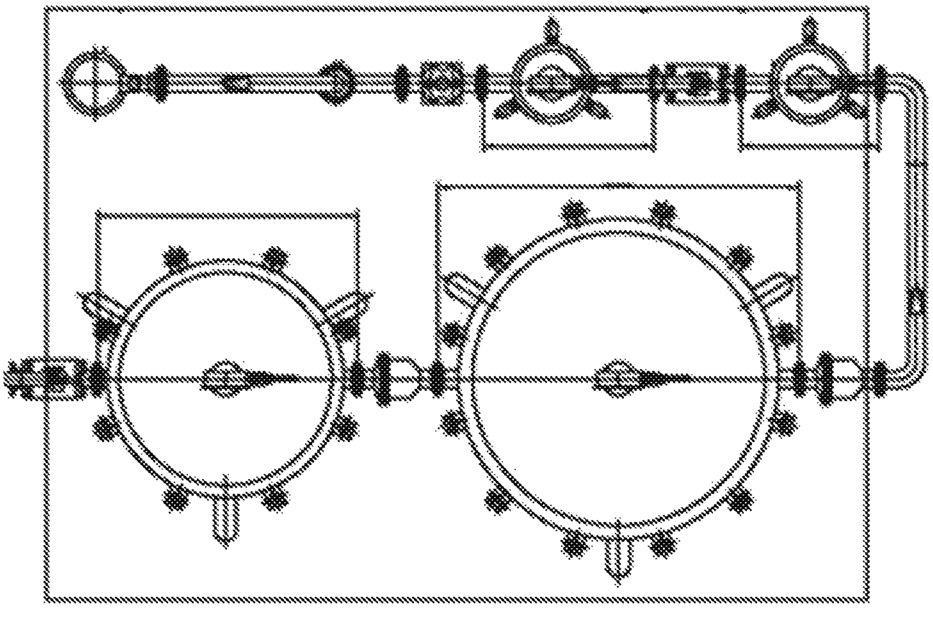
FIG. 2: Top view of the apparatus used for carrying out the process for the treatment of spent media from vegetable pickle.
Figure 3:
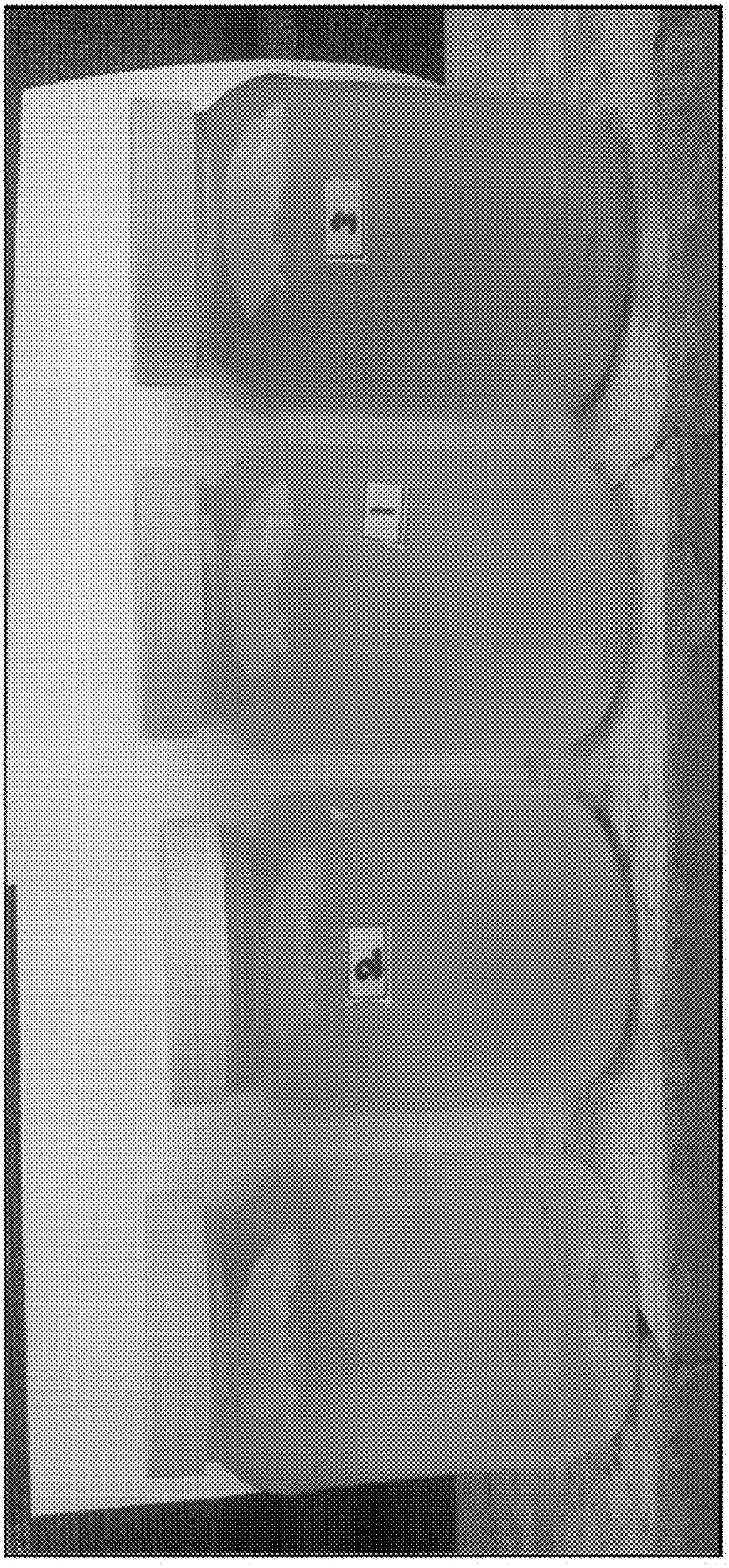
FIG. 3: Picture showing the samples of fresh spent media, spent media of less than one month old (good), spent media of 1 to 3 months old (bad) and spent media of 6 to 12 months old (worst).
Figure 4:
FIG. 4: Picture showing spent media solution of Gherkin

For the purposes of the following detailed description, it is to be understood that the invention may assume various alternative variations and step sequences, except where expressly specified to the contrary.

Thus, before describing the present invention in detail, it is to be understood that this invention is not limited to particularly exemplified systems or process parameters that may of course, vary. It is also to be understood that the terminology used herein is for the purpose of describing particular embodiments of the invention only, and is not intended to limit the scope of the invention in any manner.

Unless otherwise defined, all technical and scientific terms used herein have the same meaning as commonly understood by one of ordinary skill in the art to which this invention pertains. In the case of conflict, the present document, including definitions will control.

As used herein, the terms "comprising" "including," "having," "containing," "involving," and the like are to be understood to be open-ended, i.e., to mean including but not limited to.

The following definitions are used in connection with the present application unless the context indicates otherwise.

Pickling: Pickling is the process of preserving or extending the shelf life of food by either anaerobic fermentation in brine or immersion in vinegar or acetic acid. However in the present context, this refers to process of preserving or extending the shelf life of food by immersion in vinegar (natural source) or acetic acid (synthetic source). The pickling procedure typically affects the food's texture, taste and flavor. The resulting food is called a pickle. A distinguishing characteristic is a pH of 4.6 or lower, which is sufficient to kill most bacteria. Pickling can preserve perishable foods for months.

Spent Media: The media drained out from containers containing pickled vegetable during repackaging of pickled vegetables. The spent media refers to vinegar medium with an acid content of 2.0% and above, preferably an acid content of 3.6% and a salt content of 3% and above, preferably a salt content of 4.0% depending on output of various acidified products' processing. Acids present in media may include acetic acid. Salts present in the media may include sodium chloride.

Treated spent media: The media obtained as a result of subjecting the spent media to the process of the subject invention.

The present invention related to a process of treatment of spent media from vegetable pickles to make it reusable for the preservation of vegetables. The process involves the treatment of spent media, media drained out from containers of vegetable pickles during repackaging, in the following sequence of steps.

Treatment by Activated Carbon:

Activated carbon, also called as activated charcoal is a form of carbon processed to have small, low volume pores that increase the surface area available for adsorption or chemical reactions. Spent media is mixed with activated carbon inside a tank and subjected to heating to a particular temperature 40 to 50° C. for a time period of about 60 to 90 minutes. Said heating is achieved by means of heating coils provided inside the tank. The mixing is also accelerated by means of mechanical stirrer. The amount of activated carbon to be employed in this phase varies depending on the age, appearance, turbidity and chemical constitution of spent media. The output of this step is referred as heated spent media.

Treatment by CMDF Sheet Filter:

The heated spent media is then subjected to filtration by circulation through CMDF (charge modified depth filter) sheet filter, which is fitted in a stainless steel cylindrical housing. Said CMDF filter is a porous and tortuous network made up of diatomaceous earth and cellulose and is capable of removing bacteria, suspended particulate matter and cellular debris by both mechanical entrapment and electrokinetic adsorption. The output or filtrate obtained from this step is referred for convenience as CMDF filtrate.

Treatment by CMDF Carbon Module:

The CMDF filtrate is then subjected to further filtration by CMDF carbon filtration module which is made of highly porous activated carbon combined with cellulose fibers, and is also fitted in a stainless steel cylindrical housing. CMDF carbon module helps in de colorization and also in absorption of a wide array of contaminants or suspended particulate matter from the flowing CMDF filtrate. The output or the filtrate is referred as CMDF Carbon filtrate.

Treatment by Polypropylene Membrane Filter:

Said CMDF Carbon filtrate is then subjected to filtration through a polypropylene membrane filter made of poly propylene membrane of uniform thickness and controlled pore sizes. Filtration through polypropylene membrane filter helps in the removal of sub-micron organic and inorganic particulate matter. The pore size of polypropylene membrane filter ranges from 0.2 μm to 1.2 μm, more preferably from 0.4 μm to 1.2 μm, most preferably pore size of 1.2 μm is employed. The filtrate obtained as an output from polypropylene membrane is referred as PP filtrate.

Treatment by Polyether Sulphone Filter:

The PP filtrate is then subjected to filtration through a polyether sulphone cartridges with a pore size ranging from 0.1 to 0.2 μm which helps in the removal of fine particles, bacteria and fungi. The output is referred as PES filtrate.

Treatment by Ultraviolet Sterilizer:

The PES filtrate is then subjected to sterilization by ultraviolet radiation by circulating the same through ultraviolet filter. The output obtained is referred as UV filtrate.

Addition of Sulphites and Acids:

The UV filtrate is then added with additives such as salts and acids. The salts includes sulphites, bisulphites, meta bisulphite salts of sodium and potassium and are added at a concentration of 0.2-0.5 mg/ml or 200 to 500 ppm. Acids includes acids of synthetic origin such as acetic acid or acids of natural origin such as natural alcohol vinegar. Either acetic acid or natural alcohol vinegar is added at a concentration of 10-15% v/v mainly to bring the pH to target levels of less than 3.0 and to curb microbial growth. The final output is referred as treated spent media.

Storage Under Ambient Conditions:

The treated spent media is transferred and stored in covered and sealed containers under ambient storage conditions such as at room temperature.

Characteristics of Treated Spent Media:

The treated spent media is comparable to the fresh media in all the physical (Turbidity, appearance), chemical (salt content, acid content), biological (no microbiological organisms) and organoleptic (odor, color) properties and is suitable for the preservation of vegetables by pickling process. All vegetables can be preserved through pickling process by using said treated spent media. Said vegetable include, but are not limited to gherkins, cucumber, cabbage, cauliflower, singly or in combination. Surprisingly, the treated spent media produced by the process exhibited enhanced shelf life and can be stored for up to 12 months at ambient storage temperature conditions without losing any of afore-recited properties. The treated spent media can be substituted for fresh vinegar media for producing fresh-pack or quick process vegetable pickles. Fresh-pack or quick process vegetable pickles are not fermented by lactic acid bacteria to increase their acidity but are rather covered with vinegar to increase their acidity.

Advantages of the Invention

The process of the present invention is cost effective, simpler and proceeds at a faster rate than the conventional techniques, commercially viable and scalable to industrial production. The surplus spent media drained from vegetable pickle treated with the process of the present invention, results in the generation of treated spent media, with comparable physical, chemical, biological and organoleptic parameters as that of the fresh media and also with enhanced shelf life of up to one year. Said treated spent media can be used for preserving vegetables as fresh media, thereby reducing the dependency on fresh media employed for vegetable preservation. The burden of disposal of spent media by evaporation is no longer required, which confers advantages such as reduction in cost and labour needed for said disposal. Additionally, cost involved in maintenance of effluent treatment plants, procurement of raw material for generating fresh media and inventory management of key raw materials such as natural vinegar and salts can be reduced. Moreover reduced utilization of effluent treatment plant and disposal of spent media by evaporation drastically reduces the harmful impact caused by the disposal of spent media on the environment.

EXAMPLES

The following examples are set forth to further exemplify the invention and are not intended to be limiting thereof.

Example 1

Gherkin spent media solution having a chemical Composition of 3-3.5% Acetic acid, 4-4.5% NaCl, 1500 ppm Calcium Chloride, 100-150 ppm Sulfates in a batch volume of 1500 ltr spent media per day and 50000 ltr/month was subjected to the filtration process at room temperature and pH of 3.0 to 3.5. The required flow rate was maintained at 1000-2000 ltr/hr. The spent media solution was classified on the basis of age of spent media solution. <1 months old sample—good; 1-3 months old sample—bad; Above 6 months year old sample—worst. The following Quality Control Parameters were monitored for the treated spent media generated post subjecting the spent media solution to the treatment process: Organoleptic Parameters such as Color and Odor; Microbial Parameters such as Total bacteria count, coliform, *E. coli*, Yeast, Mold and the parameters such as Throughput, Flow rate, Flux and Pressure were monitored throughout the treatment process.

Equipment Used:

1. 90 mm diameter filter pad holder,
2. 47 mm diameter filter pad holder
3. Compressor
4. Pressure Vessel,
5. Measuring Cylinder,
6. Beaker with graduation, Stopwatch, etc.

Filter Media Used:

1. CMDF 15 (Charge modified depth filter sheet)
2. MIPL 72 C (charge modified depth filter sheet comprising activated carbon and/or cellulose.)
3. 1.2μ PP MEMBRANE (polypropylene membrane filter Trial 1: (Spent Media which is More than 6 Months Old)

Spent media from worst condition sample was passed through charge modified filter media to remove the haze and suspended particles. The filtrate was subsequently filtered through activated carbon CMDF to eliminate color impurities and the filtrate of activated carbon CMDF was filtered through 1.2 micron polypropylene membrane as a final polisher to ensure colloidal haze free filtrate.

| Filter Media | Volume L | Time min. sec | Pressure Kg/cm$^2$ | Flow rate L/hr | Area m$^2$ | Flux LMH | Throughput L | Appearance |
|---|---|---|---|---|---|---|---|---|
| CMDF15 | 3 | 6.01 | 2 | 30 | 0.0045 | 6666.66 | 666.66 | Clear |
| CMDF72 FOLLOWED BY 1.2μ PP membrane | 3 | 38 | 2 | 4.73 | 0.0045 | 1052.63 | 222.22 | Clear & Colorless but slightly acrid odor |

Trial 2: (Spent Media which is More than 6 Months Old)

5% of loose activated carbon was added into spent media from worst condition sample and stirred for 30 minutes then this fluid was filtered twice through activated carbon CMDF pad to reduce and eliminate color impurities and acrid smell of the solution and filtrate of activated carbon CMDF was filtered through 1.2μpolypropylene membrane as a final polisher to ensure colloidal haze free filtrate.

| Filter Media | Volume L | Time min | Pressure $Kg/cm^2$ | Flow rate L/hr | Area $m^2$ | Flux LMH | Throughput L | Appearance |
|---|---|---|---|---|---|---|---|---|
| Carbon slurry passed through CMDF 72C | 3 | 11 | 2 | 16 | 0.0045 | 3636.36 | — | Clear & Colorless |
| $2^{ND}$ pass through CMDF 72C followed by 1.2μPP membrane | 3 | 36 | 2 | 5 | 0.0045 | 1111.11 | 222.22 | Clear & Colorless as well as odorless. |

The filtrate of CMDF was satisfactory in terms of clarity, free of haze and suspended particles. The filtrate of activated CMDF followed by 1.2μ polypropylene membrane was absolutely clear and free of color and odor up to the saturation point. Addition of loose activated carbon helped to reduce color and odor from spent media and eliminate extra load on activated carbon CMDF filter. However, the filtrate obtained (treated spent media) is not commercially viable as it needs increased amount of loose activated carbon to achieved the desired end result.

Trial 3: Spent Media which is Less than One Month Old

Spent media, which is less than one month old was filtered twice through activated carbon CMDF pad to reduce/eliminate color impurities and acrid smell of solution and filtrate of activated carbon CMDF was filtered through 1.2μ polypropylene membrane as a final polisher to ensure colloidal haze free filtrate.

| Filter Media | Volume L | Time min | Pressure $Kg/cm^2$ | Flow rate L/hr | Area $m^2$ | Flux LMH | Throughput L | Appearance |
|---|---|---|---|---|---|---|---|---|
| Solution passed through CMDF 72C | 1 | 14 | 2 | 4.2 | 0.0045 | 952.38 | — | Clear & Colorless |
| $2^{ND}$ pass through CMDF 72C followed by 1.2μPP membrane | 1 | 12 | 2 | 5 | 0.0045 | 1111.11 | 222.22 | Clear & Colorless as well as odorless |

Filtrate of 2 pass through activated carbon CMDF followed by 1.2μ was absolutely clear and free from color, odor and microbial burden. Additionally the sample obtained is very much suitable for re-use and is commercially viable.

Example 2: Test to Confirm the Enhanced Shelf Life of Treated Spent Media

The treated spent media obtained by the process of treatment described in trial 3 of Example 1 was tested for its organoleptic properties and for the presence of microbial load over a period of 2 months of shelf life. The results for the same are described below:

| Srl. No. | Parameters evaluated | Day 1 | Day 30 | Day 60 |
|---|---|---|---|---|
| 1 | Visual appearance in terms of color | Light Yellow color liquid | Light Yellow color liquid | Light Yellow color liquid |
| 2 | Odor | Strong Acid Smell | Strong Acid Smell | Strong Acid Smell |

| Srl. No. | Parameters evaluated | Units | Specified limits | Day 1 | Day 30 | Day 60 |
|---|---|---|---|---|---|---|
| 1 | Total Viable Count | Cfu/ml | Not specified | <1 | <1 | <1 |
| 2 | *E. coli* | /25 ml | Absent | Absent | Absent | Absent |
| 3 | *Salmonella* | /25 ml | Absent | Absent | Absent | Absent |
| 4 | *Staphylococcus aureus* | /25 ml | Absent | Absent | Absent | Absent |
| 5 | Yeast | Cfu/ml | Absent | <1 | <1 | <1 |
| 6 | Mold | Cfu/ml | Absent | <1 | <1 | <1 |

The total viable count was measured using IS:5402 Horizontal method for enumeration of micro-organisms—colony count technique at 30° C. Coliform/*E. coli* count was measured using IS:5401 (Part-1) at 30° C. and IS:5887 (Part-1) respectively. *Salmonella* was measured using ISO 6579:2002, *Staphylococcus aureus* was measured using ISO 6888-3:2004, Yeast colonies was measured using IS:5403 and Mold colonies was measured using IS:5403.

Example 3: Effects of Heating the Mixture of Spent Media with Activated Carbon Different batches of spent media were run through the media treatment system, to arrive at specific efficacy of the heating system, for time taken to achieve required clarity of media as output for next stage. The desired output levels-level of clarity through check glass is monitored and time taken for achieving clear media, is noted. The unheated media sample run is taken as reference point.

Activated carbon used is constant value at 9 kg/batch run. The volume of the batch is constant at 1000 liters or 4 barrels. When heating is on, time taken to obtain desired output is reduced by 13 to 35%, from the average time without heating (85° C.)

| Batch No. | Spent Media | Temperature settings ° C. | Time taken to achieve required clarity of media minutes |
|---|---|---|---|
| 1 | 28 days old | No heating | 80 |
| 2 | 28 days old | 45.0 | 55 |
| 3 | 28 days old | 45.0 | 50 |
| 4 | 40 days old | 50.0 | 58 |
| 5 | 40 days old | 40.0 | 60 |
| 6 | 39 days old | No heating | 90 |
| 7 | 39 days old | 45.0 | 68 |
| 8 | 46 days old | 40.0 | 70 |
| 9 | 46 days old | 50.0 | 72 |
| 10 | 46 days old | 45.0 | 68 |

The invention claimed is:

1. A process for treatment of spent media from vegetable pickle, comprising the steps:

a) adding activated carbon to the spent media and heating the media to a temperature of at least 40° C., b) circulating the media from step a) through a charge modified depth filter sheet, c) passing the filtrate from step b) through a membrane filter, d) circulating the filtrate from step c) through an ultra violet filter, e) adding sulphites to the filtrate of step d), and f) adding acetic acid or natural alcohol vinegar to the filtrate of step e) to produce the treated spent media.

2. The process as claimed in claim 1, wherein the media is heated to a temperature of 40-50° C. in step (a).

3. The process as claimed in claim 1, wherein the charge modified depth filter sheet of step (b) comprises diatomaceous earth and/or cellulose.

4. The process as claimed in claim 1, wherein the filtrate from step (b) is further circulated through a carbon filter before passing through the membrane filter of step (c).

5. The process as claimed in claim 4, wherein the carbon filter is a charge modified depth filter sheet comprising activated carbon and/or cellulose.

6. The process as claimed in claim 1, wherein the membrane filter is a polypropylene membrane filter.

7. The process as claimed in claim 6, wherein the pore size of the polypropylene membrane filter is 1.2 microns or less.

8. The process as claimed in claim 1, wherein the filtrate from step (c) is further passed through a poly ether sulphone filter before circulating the filtrate through the ultra violet filter.

9. The process as claimed in claim 1, wherein sulphites are added to the filtrate of step d) to provide a concentration of 0.2-0.5 mg/ml or 200 to 500 ppm.

10. The process as claimed in claim 1, wherein the sulphite comprises sulphites, bisulphites or metabisulphite salts of sodium or potassium.

11. The process as claimed in claim 1, wherein 10%-15% v/v acetic acid or 10%-15% v/v natural alcohol vinegar is added to the filtrate of step e).

12. The process as claimed in claim 1, wherein the treated spent media can be stored for up to 12 months at ambient storage temperature conditions.

13. The process as claimed in claim 1, wherein the spent media is a spent vinegar medium with an acid content of 3.6% and a salt content of 4.0%.

* * * * *